(12) United States Patent
Ikenohata et al.

(10) Patent No.: US 10,071,703 B2
(45) Date of Patent: Sep. 11, 2018

(54) HEAD-PROTECTING AIRBAG DEVICE AND FOLDED-UP BODY OF HEAD-PROTECTING AIRBAG

(71) Applicant: TOYODA GOSEI CO., LTD., Kiyosu-shi, Aichi-ken (JP)

(72) Inventors: Sho Ikenohata, Kiyosu (JP); Koji Kawamura, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 52 days.

(21) Appl. No.: 15/359,726

(22) Filed: Nov. 23, 2016

(65) Prior Publication Data

US 2017/0151924 A1 Jun. 1, 2017

(30) Foreign Application Priority Data

Nov. 30, 2015 (JP) .................................. 2015-234019

(51) Int. Cl.

| B60R 21/213 | (2011.01) |
|---|---|
| B60R 21/231 | (2011.01) |
| B60R 21/232 | (2011.01) |
| B60R 21/2334 | (2011.01) |
| B60R 21/235 | (2006.01) |
| B60R 21/237 | (2006.01) |

(52) U.S. Cl.
CPC .......... *B60R 21/213* (2013.01); *B60R 21/232* (2013.01); *B60R 21/235* (2013.01); *B60R 21/237* (2013.01); *B60R 21/2334* (2013.01); *B60R 21/23138* (2013.01); *B60R 2021/23509* (2013.01)

(58) Field of Classification Search
CPC ... B60R 21/213; B60R 21/237; B60R 21/235; B60R 21/232; B60R 21/23138; B60R 21/2334; B60R 2021/23509
See application file for complete search history.

(56) References Cited

U.S. PATENT DOCUMENTS

| 7,658,401 B2* | 2/2010 | Valdez ................... B60R 21/232 280/730.2 |
| 2014/0217707 A1* | 8/2014 | Konishi ................ B60R 21/213 280/728.2 |
| 2014/0265270 A1 | 9/2014 | Wang |

(Continued)

FOREIGN PATENT DOCUMENTS

WO 2014/149906 A1 9/2014

*Primary Examiner* — Darlene P Condra
(74) *Attorney, Agent, or Firm* — Posz Law Group, PLC

(57) ABSTRACT

A head-protecting airbag device includes: an airbag including: an airbag body; a mounting portion which fixes the airbag body to a body; and a tension cloth, wherein: the airbag body includes a general inflatable portion, and an end-side inflatable portion, which is partitioned from the general inflatable portion by an end-side partition portion as a closed portion; the tension cloth is disposed on the outboard side of the end-side inflatable portion in the airbag body, and the root end of the tension cloth is coupled to an area of the general inflatable portion which is closer to a central side in the front and rear direction than the end-side partition portion; and in the mounting portion, an end-side mounting portion is disposed from a position of the root end including a position of the root end of the tension cloth to an area of the general inflatable portion.

12 Claims, 11 Drawing Sheets

(56) References Cited

U.S. PATENT DOCUMENTS

| | | | | |
|---|---|---|---|---|
| 2015/0191141 A1* | 7/2015 | Wang | ................... | B60R 21/232 |
| | | | | 280/730.2 |
| 2016/0107602 A1* | 4/2016 | Nakashima | ........... | B60R 21/233 |
| | | | | 280/728.2 |
| 2016/0185314 A1* | 6/2016 | Kawamura | ........... | B60R 21/232 |
| | | | | 280/728.2 |
| 2016/0297394 A1* | 10/2016 | Fujiwara | ............... | B60R 21/232 |
| 2017/0327073 A1* | 11/2017 | Arima | .................. | B60R 21/232 |

\* cited by examiner

HEAD-PROTECTING AIRBAG DEVICE AND FOLDED-UP BODY OF HEAD-PROTECTING AIRBAG

CROSS-REFERENCE TO RELATED APPLICATION(S)

This application is based upon and claims the benefit of priority from Japanese Patent Application No. 2015-234019, filed on Nov. 30, 2015, the entire contents of which are incorporated herein by reference.

BACKGROUND

1. Field of the Invention

The present invention relates to a head-protecting airbag device including an airbag which is stored in a folded-up state in the upper periphery of a window on the inboard side of a vehicle, has the upper periphery fixedly mounted on the body of the vehicle, and protrudes downward and is deployed to cover the inboard side of the window when an inflation gas flows from an inflator, and a folded-up body of the head-protecting airbag.

2. Description of the Related Art

In the related art, a head-protecting airbag device is configured such that an airbag includes an airbag body, and a tension belt which extends from the front end of the airbag body and has a leading end fixed in a front pillar. In the head-protecting airbag device according to the related art, the airbag body includes an end-side inflatable portion, which is divided from a general inflatable portion by an end-side partition portion, on the front end at the time of the inflation completion. The tension belt is coupled to the end-side partition portion on the root end and is disposed to cover the outboard side of the end-side inflatable portion so as to push the end-side inflatable portion to the inboard side when the airbag is completely inflated (for example, see WO 2014-149906).

In the head-protecting airbag device according to the related art, when the inflation is completed, the end-side inflatable portion of the airbag body is disposed to cover the inboard side area of the front pillar, which is disposed to be tilted forward and downward, in the front periphery of the window. Therefore, the airbag is stored in a state of being folded up with the end-side inflatable portion folded to the end-side partition portion.

In the head-protecting airbag device according to the related art, however, since the root end of a tension cloth is coupled to the end-side partition portion, the end-side inflatable portion can be folded only in a front area of the end-side partition portion, and a folded amount thereof is limited. Therefore, the head-protecting airbag device has room for improvement in that a freedom degree in installing on the vehicle is not high, and a freedom degree in installing on the vehicle is increased.

SUMMARY

The invention has been made to solve the above-described problem, and an object of the invention is to provide a head-protecting airbag device which has a high freedom degree in installing on the vehicle, and is easily adaptable even when the installed vehicle is changed.

According to an aspect of the invention, there is provided a head-protecting airbag device including: an airbag which is stored in a folded-up state in an upper periphery of a window on an inboard side of a vehicle, and is deployed to cover the inboard side of the window when an inflation gas flows from an inflator, the airbag including: an airbag body which is formed in a bag shape with flexibility, and is inflated to cover the inboard side of the window when the inflation gas flows inside; a mounting portion which is disposed at plural positions in a front and rear direction of the airbag body, and fixes the airbag body to a body of the upper periphery of the window; and a tension cloth which is formed of a sheet material with flexibility, the tension cloth having a root end coupled to the airbag body and a leading end fixed on the body of the vehicle in the periphery of the window separated from one end of the airbag body in the front and rear direction, wherein: the airbag body includes an inflatable portion, which is inflated to separate an inboard side wall and an outboard side wall when the inflation gas flows inside, and a closed portion which is formed by coupling the inboard side wall and the outboard side wall and does not admit the inflation gas to flow inside; the inflatable portion includes a general inflatable portion, and an end-side inflatable portion, which is partitioned from the general inflatable portion by an end-side partition portion as a closed portion, on an end in the front and rear direction as a tension cloth side at the time of the inflation completion; the tension cloth is disposed on the outboard side of the end-side inflatable portion in the airbag body at the time of the inflation completion, and the root end of the tension cloth is coupled to an area of the general inflatable portion which is closer to a central side in the front and rear direction than the end-side partition portion; and in the mounting portion, an end-side mounting portion, which is disposed on one end in the front and rear direction as the tension cloth side, is disposed from a position of the root end including a position of the root end of the tension cloth to an area of the general inflatable portion.

According to the head-protecting airbag device of the invention, the root end of the tension cloth covering the outboard side of the end-side inflatable portion is coupled to the area of the general inflatable portion which is closer to the central side in the front and rear direction than the end-side partition portion. For this reason, according to the head-protecting airbag device of the invention, in a case where the airbag, which is folded up with the end-side inflatable portion folded, is stored in the upper periphery of the window, the end-side inflatable portion can be folded even in a position which is closer to the central side in the front and rear direction than the end-side partition portion, and thus a freedom degree of setting a folded amount is high. For example, even when the vehicle has a type with a pillar which has a small tilted angle in the front and rear direction and is elongated in the front and rear direction, the airbag can be easily adapted by folding up the airbag with a folded amount set to be large. The folded airbag can be stored in the upper periphery of the window in the state of suppressing entrance into the pillar.

Therefore, according to the head-protecting airbag device of the invention, the freedom degree in installing on the vehicle is high, and the head-protecting airbag device can be easily adapted even when the installed vehicle is changed.

In the head-protecting airbag device of the invention, the tension cloth, which generates a tension substantially in the front and rear direction when the airbag is completely inflated, pushes the end-side inflatable portion to the inboard side, and the outboard side of the end-side inflatable portion can be supported by the tension cloth. Thus, the head of the occupant moving obliquely forward or obliquely rearward at the time of the oblique collision can be reliably protected by the end-side inflatable portion.

In the head-protecting airbag device of the invention, when each of the mounting portion and the end-side mounting portion is formed to protrude from the upper periphery of the airbag body, the mounting portion and the end-side mounting portion can protrude from a folded-up body formed by folding up the airbag body. Thus, the folded airbag is fixed to the body of the vehicle with excellent workability, which is preferable.

In the head-protecting airbag device with the above configuration, the tension cloth includes an upper coupling point and a lower coupling point, which are formed in vertically separated positions, on the root end. The upper coupling point and the lower coupling point are coupled to an upper coupled portion and a lower coupled portion as closed portions, respectively, which is preferable.

When the head-protecting airbag device is configured as above, the tension cloth supports the outboard side of the end-side inflatable portion in a vertically wide range. Thus, the head of the occupant can be more exactly protected by the end-side inflatable portion.

Specifically, in the head-protecting airbag device with the above configuration, at least one of the upper coupled portion and the lower coupled portion may be formed to be separated from a peripheral portion forming the outer periphery of the inflatable portion.

The upper coupled portion and the lower coupled portion may be formed to be continuous from the peripheral portion.

In the head-protecting airbag device with the above configuration, the tension cloth is configured such that a periphery on the root end thereof is recessed toward the leading end in an area between the upper coupling point and the lower coupling point. Thus, by forming the periphery on the root end to be recessed, the usage amount of the sheet material forming the tension cloth can be reduced, the airbag can be compactly folded up, and a reduction in weight can be achieved, which are preferable.

In the head-protecting airbag device with the above configuration, the tension cloth is configured such that a separation distance to the upper coupling point from a fixing piece, which fixes the tension cloth to the body on the leading end is substantially equal to a separation distance to the lower coupling point from the fixing piece. Thus, a large tension occurs equally on the straight line connecting the fixing piece and the upper coupling point and on the straight line connecting the fixing piece and the lower coupling point when the airbag body is completely inflated. For this reason, when the airbag body is completely inflated, the tension can be generated in a vertically wide fan-shaped area, which is between both peripheries connecting the fixing piece with the upper coupling point and the lower coupling point, in the tension cloth. Thus, the tension cloth, which generates the tension in a vertically wide area, can support the outboard side of the end-side inflatable portion further stably, which is preferable.

According to another aspect of the invention, there is provided a folded-up body of a head-protecting airbag including: an airbag body which is deployed to cover an inboard side of a window of a vehicle when an inflation gas flows from an inflator, the folded-up body of the head-protecting airbag being formed in a folded-up state to be storable in an upper periphery of the window, wherein: the airbag includes: an airbag body; a mounting portion which is disposed at plural positions in a front and rear direction of the airbag body and fixes the airbag body to a body of the upper periphery of the window; and a tension cloth which is formed of a sheet material with flexibility and is disposed on an outboard side of the airbag body at the time of the inflation completion and having a root end coupled to the airbag body and a leading end fixed on the body of the vehicle in the periphery of the window separated from one end of the airbag body in the front and rear direction; the airbag body includes an inflatable portion, which is inflated to separate an inboard side wall and an outboard side wall when the inflation gas flows inside, and a closed portion which is formed by coupling the inboard side wall and the outboard side wall and does not admit the inflation gas to flow inside; the inflatable portion includes a general inflatable portion, and an end-side inflatable portion, which is partitioned from the general inflatable portion by an end-side partition portion as a closed portion, on an end in the front and rear direction as a tension cloth side at the time of the inflation completion; the airbag body of the folded-up body is folded in a shape having a folded portion which is folded to superimpose the end-side inflatable portion on the general inflatable portion so as to shorten a width dimension in the front and rear direction; the folded portion includes a superimposing portion on an end-side inflatable portion side and a superimposed portion, which is adjacent to the superimposing portion and superimposed by the superimposing portion, on the general inflatable portion; a fold line forming a boundary portion between the superimposing portion and the superimposed portion is formed in an area of the general inflatable portion beyond the end-side partition portion; the tension cloth is configured such that the root end thereof is coupled to an area of the superimposed portion; and in the mounting portion, an end-side mounting portion, which is disposed on one end in the front and rear direction as the tension cloth side, is disposed on the superimposed portion.

According to the folded-up body of the head-protecting airbag of the invention, the airbag body is folded up in a state where the end-side inflatable portion disposed one end in the front and rear direction is folded to shorten the width dimension in the front and rear direction. Therefore, when being completely inflated, the airbag body is disposed to cover the inboard side of the window in an area wider in the front and rear direction than in the state of the folded-up body. That is, according to the folded-up body of the head-protecting airbag of the invention, the airbag body is compactly stored with the width dimension in the front and rear direction shortened, and can be inflated from the state to cover the inboard side of the window widely in the front and rear direction. For this reason, for example, although the vehicle has a type with the pillar which has a small tilted angle in the front and rear direction and is elongated in the front and rear direction, the folded-up body can be stored in the upper periphery of the window in a state where it is suppressed that the airbag body enters the pillar. When the airbag is completely inflated, the inboard side of the pillar can be widely covered with the unfolded end-side inflatable portion.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
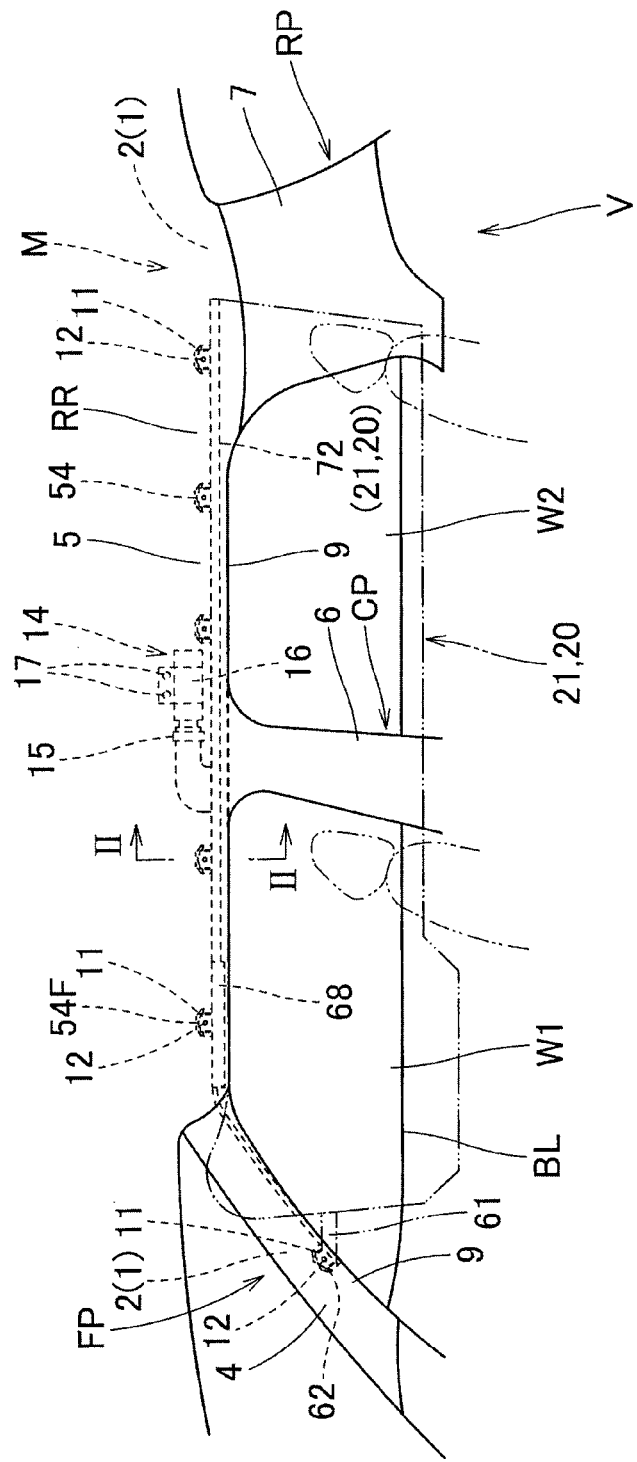
FIG. 1 is a schematic front view illustrating a head-protecting airbag device according to an embodiment of the invention when viewed from the inboard side.

Hereinafter, an embodiment of the invention will be described on the basis of the drawings. As illustrated in FIG. 1, a head-protecting airbag device M according to the embodiment is installed on a two-row seat type vehicle V having two windows (side window) W1 and W2. As illustrated in FIG. 1, the head-protecting airbag device M according to the embodiment includes an airbag 20, an inflator 14, mounting brackets 11 and 16, and an airbag cover 9. As illustrated in FIG. 1, the airbag 20 is stored in a folded-up state in an area from the lower periphery of a front pillar FP to the upper area of a rear pillar RP through the lower periphery of a roof side rail RR in the upper periphery of the windows W1 and W2 on the inboard side of the vehicle V.

Figure 2:
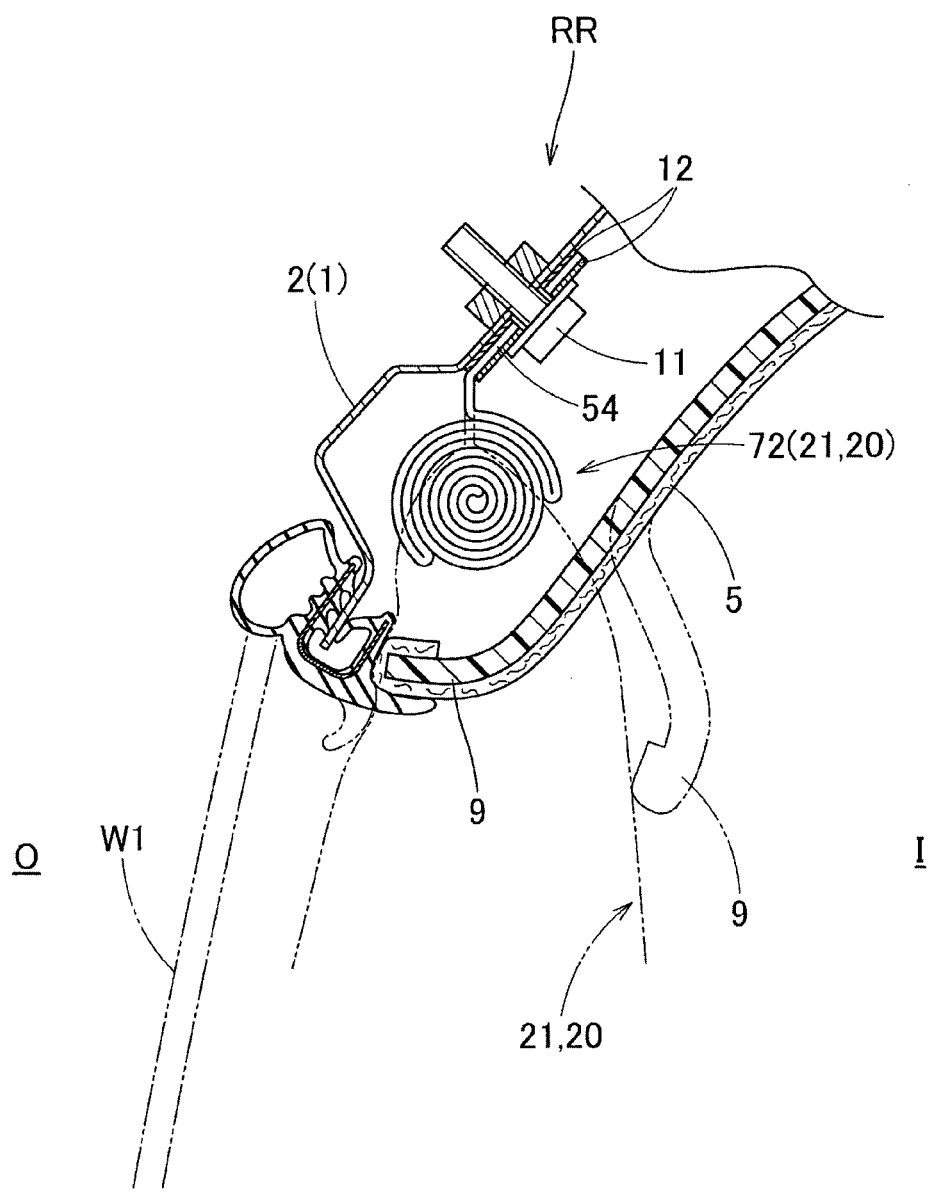
FIG. 2 is a sectional view illustrating a portion taken along line II-II of FIG. 1.
Figure 9:
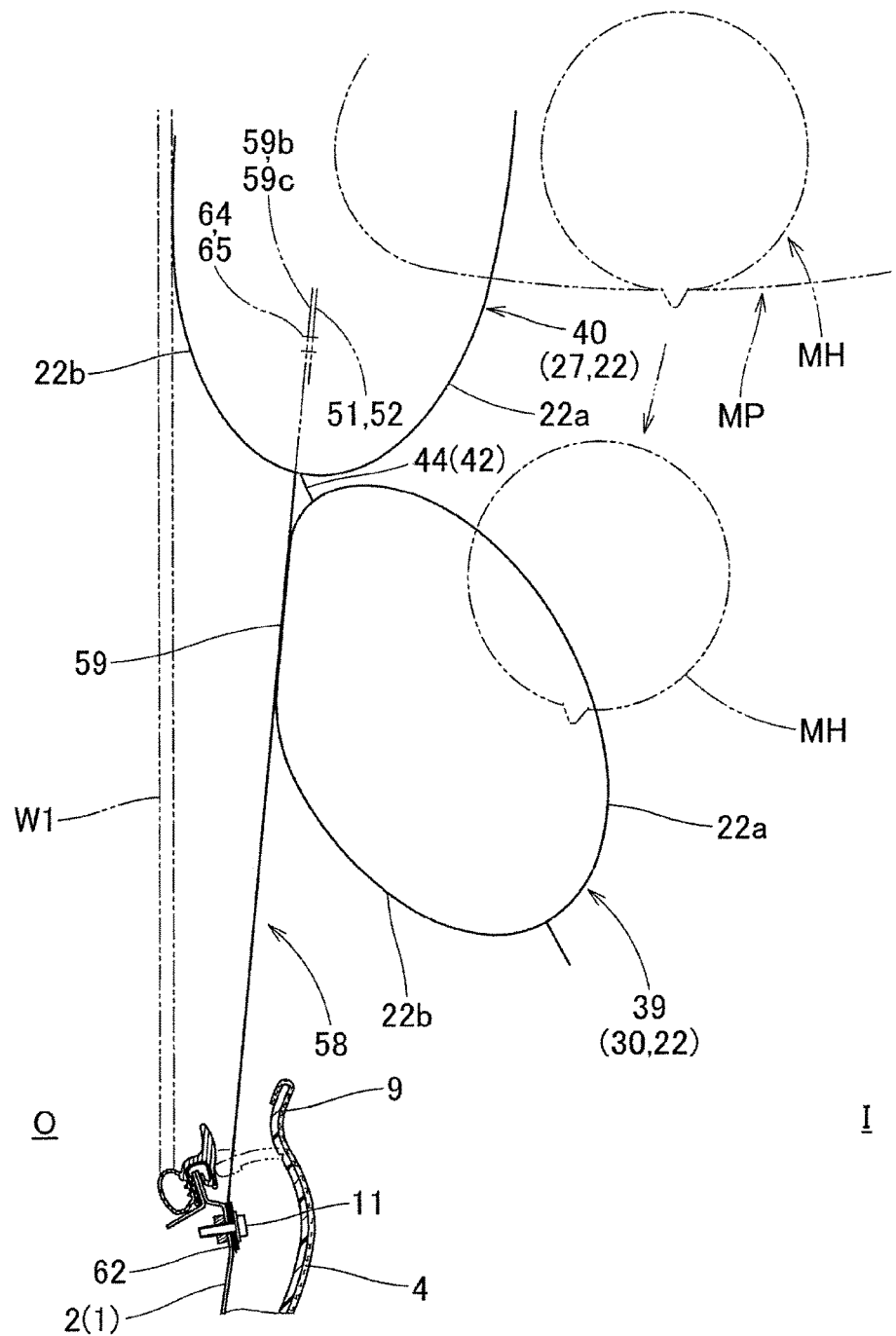
FIG. 9 is a partially-enlarged cross-sectional view schematically illustrating a state where the airbag of the head-protecting airbag device according to the embodiment is completely inflated when taken in a front and rear direction.

As illustrated in FIGS. 1, 2, and 9, the airbag cover 9 is configured from the lower peripheries of a front pillar garnish 4 disposed in the front pillar FP and a roof head lining 5 disposed in the roof side rail RR. The front pillar garnish 4 and the roof head lining 5 are made of synthetic resin, and are fixedly mounted on the inboard side I of an inner panel 2 of a body (vehicle body) 1 in the respective front pillar FP and roof side rail RR. The airbag cover 9 is configured to cover the inboard side of the airbag 20 stored in the folded-up state, and to be pushed by the airbag 20 to be openable to the inboard side so that the airbag 20 can protrude downward to the inboard side when being deployed.

The inflator 14 supplies an inflation gas to the airbag 20. As illustrated in FIG. 1, the inflator is a substantially cylindrical type, and a gas discharge port (not illustrated) which can discharge the inflation gas is disposed on the leading end of the inflator. The leading end of the inflator 14 including the vicinity of the gas discharge port is inserted to a connection port 26 (to be described later) of the airbag 20, and the inflator 14 is connected with the airbag 20 by using a clamp 15 disposed on the outer circumference of the connection port 26. The inflator 14 is mounted at a position of the inner panel 2 above the window W2 by using the mounting bracket 16 for holding the inflator 14 and a bolt 17 for fixing the mounting bracket 16 to the inner panel 2 of the body 1 (see FIG. 1). The inflator 14 is electrically connected with a control device (not illustrated) of the vehicle V through a lead wire (not illustrated), and is configured to be operated by inputting an operation signal sent from the control device when the control device detects a side collision or an oblique collision, and a rollover of the vehicle V.

As illustrated in FIGS. 2 and 9, the mounting bracket 11 is formed of a two-sheet metal plate, and clamps a mounting piece 54 (to be described later) or the fixing piece 62 of the airbag 20 from front and rear sides so as to be mounted on the mounting piece 54 and the fixing piece 62. The mounting piece 54 and the fixing piece 62 are fixedly mounted on the inner panel 2 of the body 1 by using a bolt 12.

Figure 3:
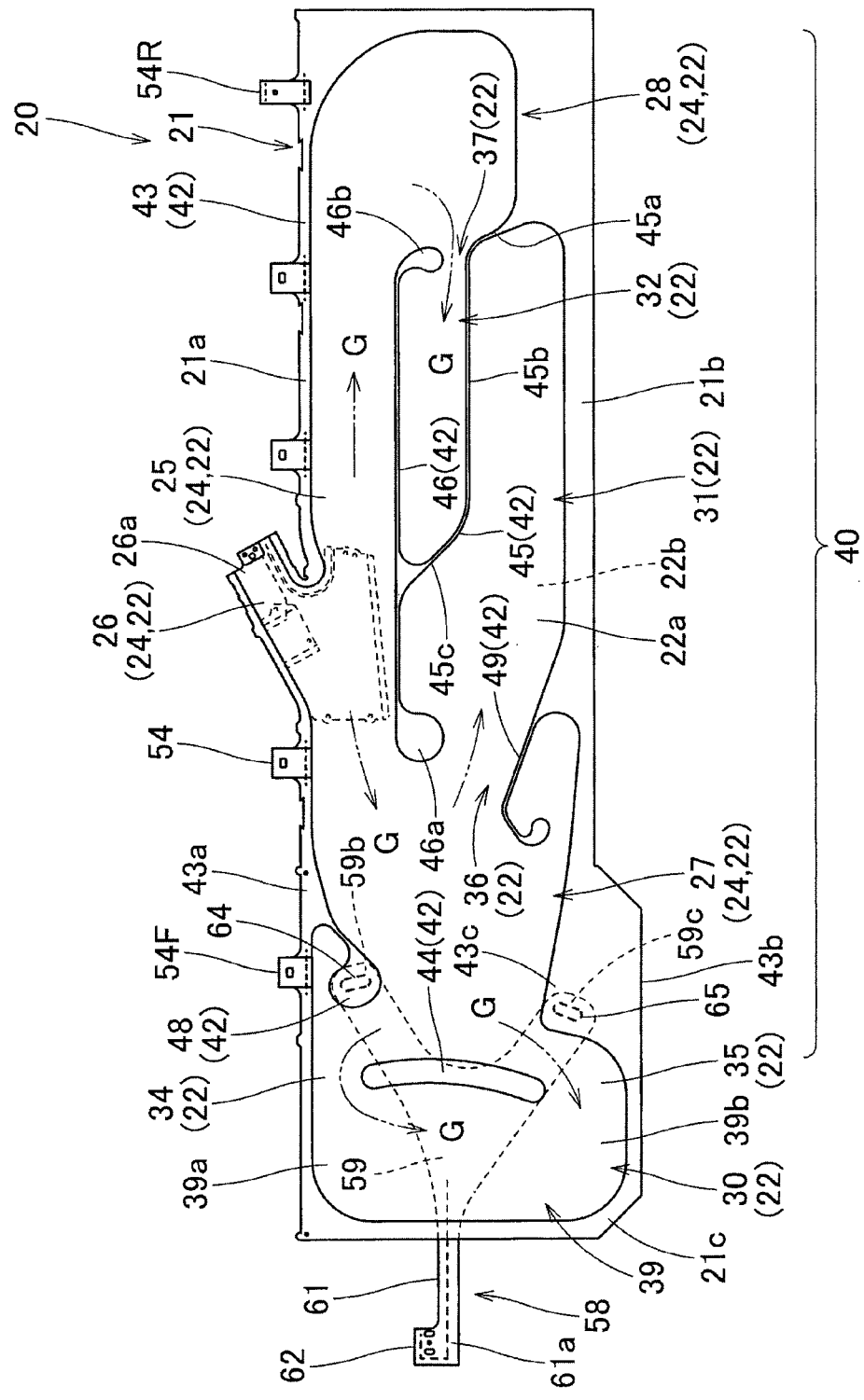
FIG. 3 is a front view illustrating a state where an airbag used in the head-protecting airbag device according to the embodiment is flatly deployed.
Figure 4:
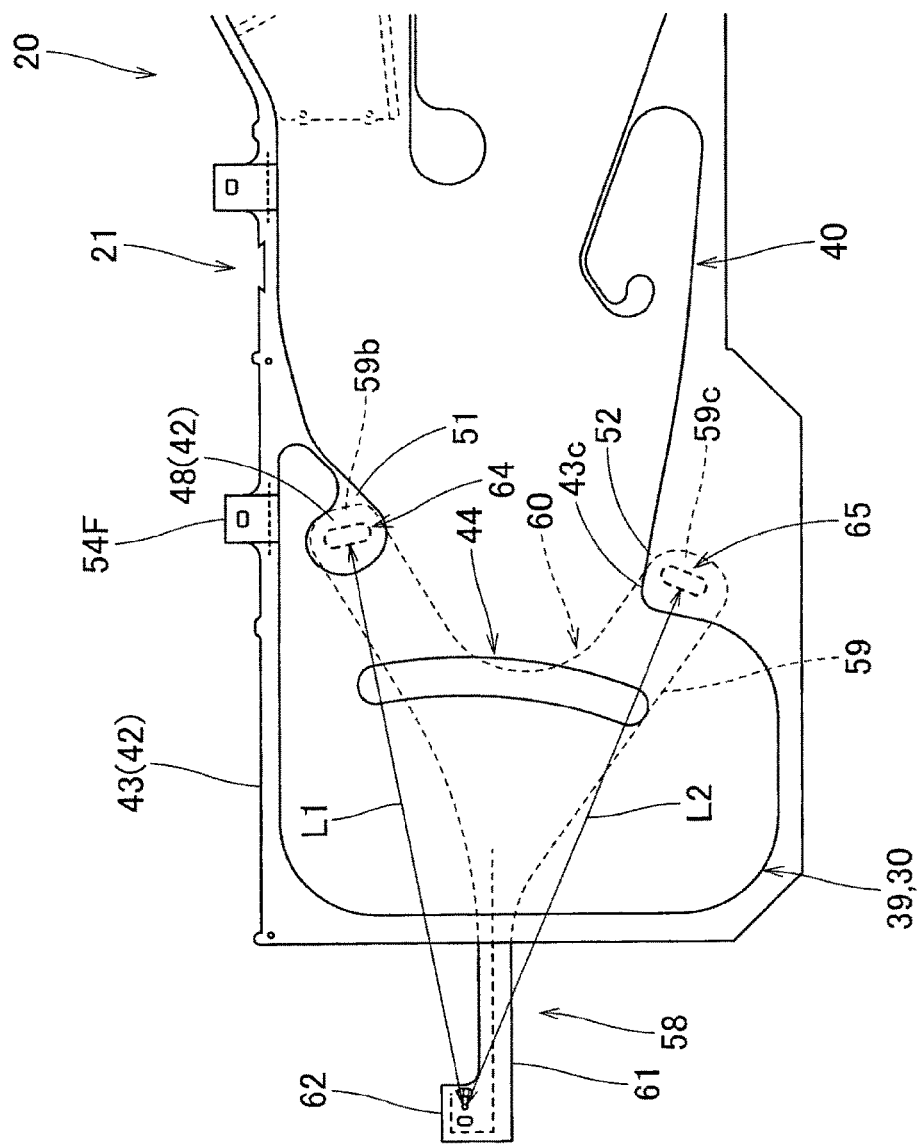
FIG. 4 is a partially-enlarged front view illustrating an end-side inflatable portion and a tension belt in the airbag of FIG. 3.
Figure 5:
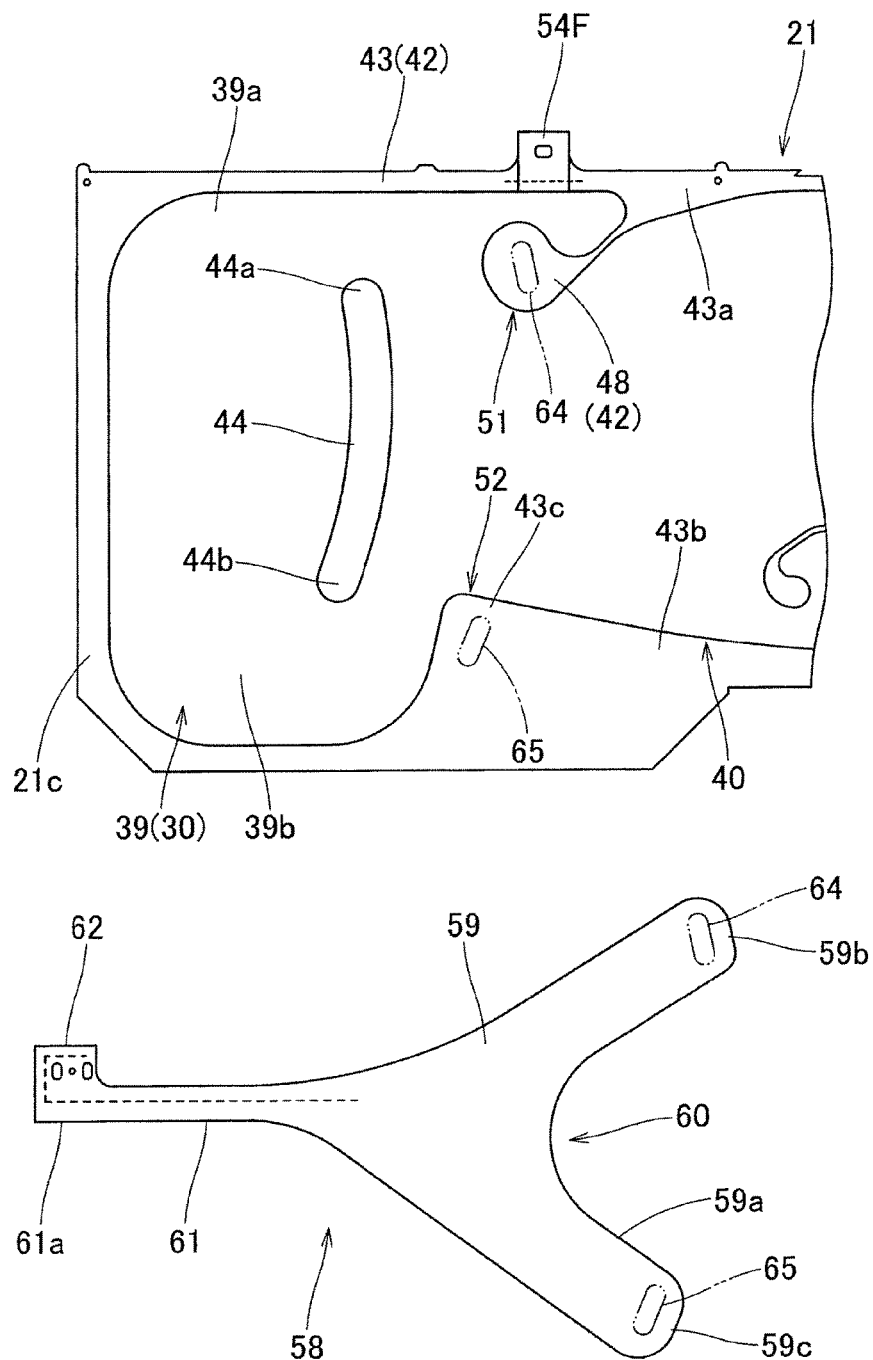
FIG. 5 is a partially-enlarged front view illustrating a state where an airbag body and the tension belt are arranged in the airbag of FIG. 3.

As illustrated in FIGS. 3 to 5, the airbag 20 includes an airbag body 21, the mounting piece 54 as a mounting portion which fixes the airbag body 21 to the inner panel 2 of the body 1 in the upper periphery of the windows W1 and W2, and a tension cloth 58 which has the root end coupled to the airbag body 21 and has the leading end fixed to the inner panel 2 of the body 1.

Figure 7:
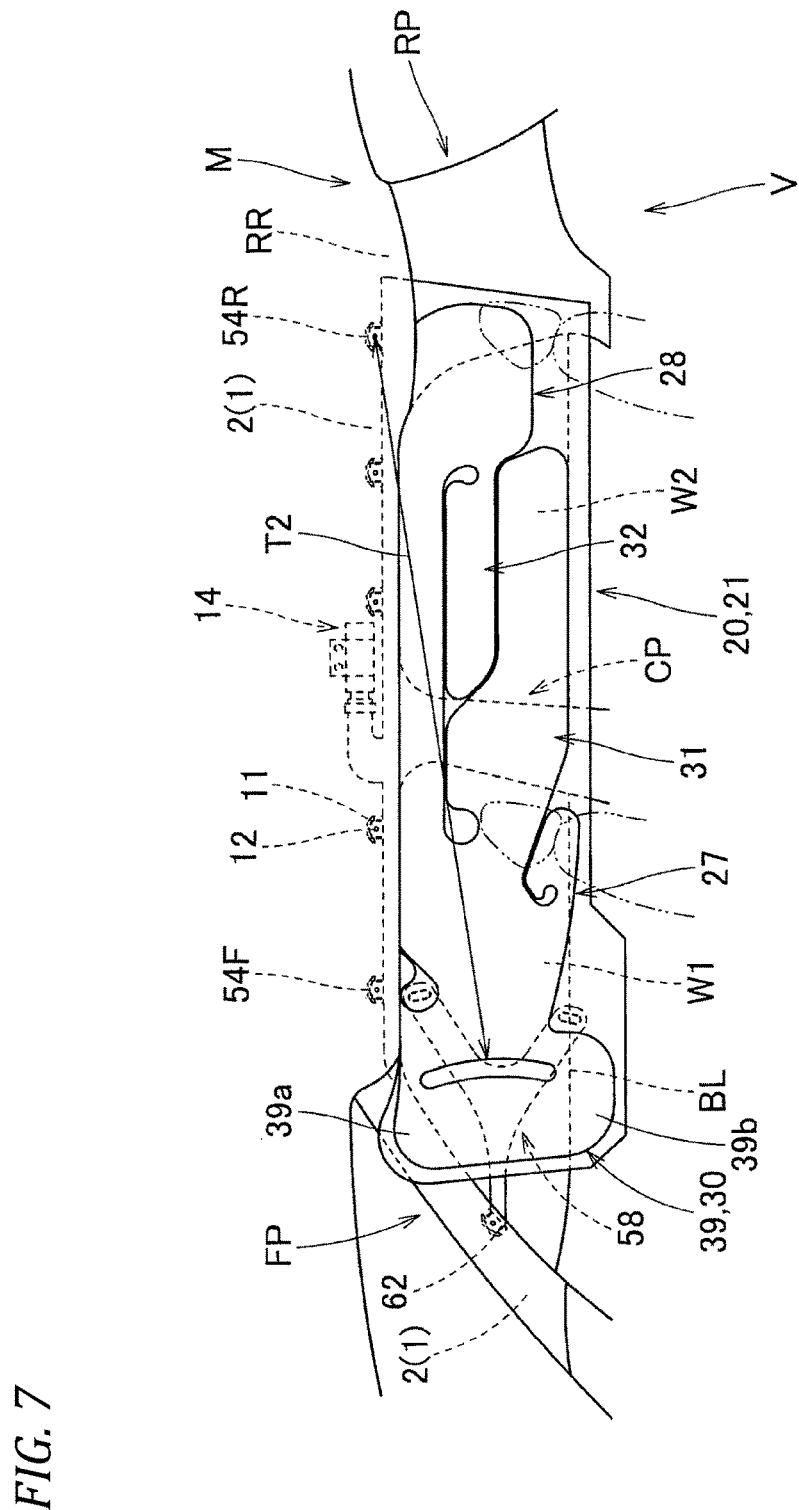
FIG. 7 is a schematic front view illustrating a state where the airbag of the head-protecting airbag device according to the embodiment is completely inflated when viewed from the inboard side.
Figure 8:
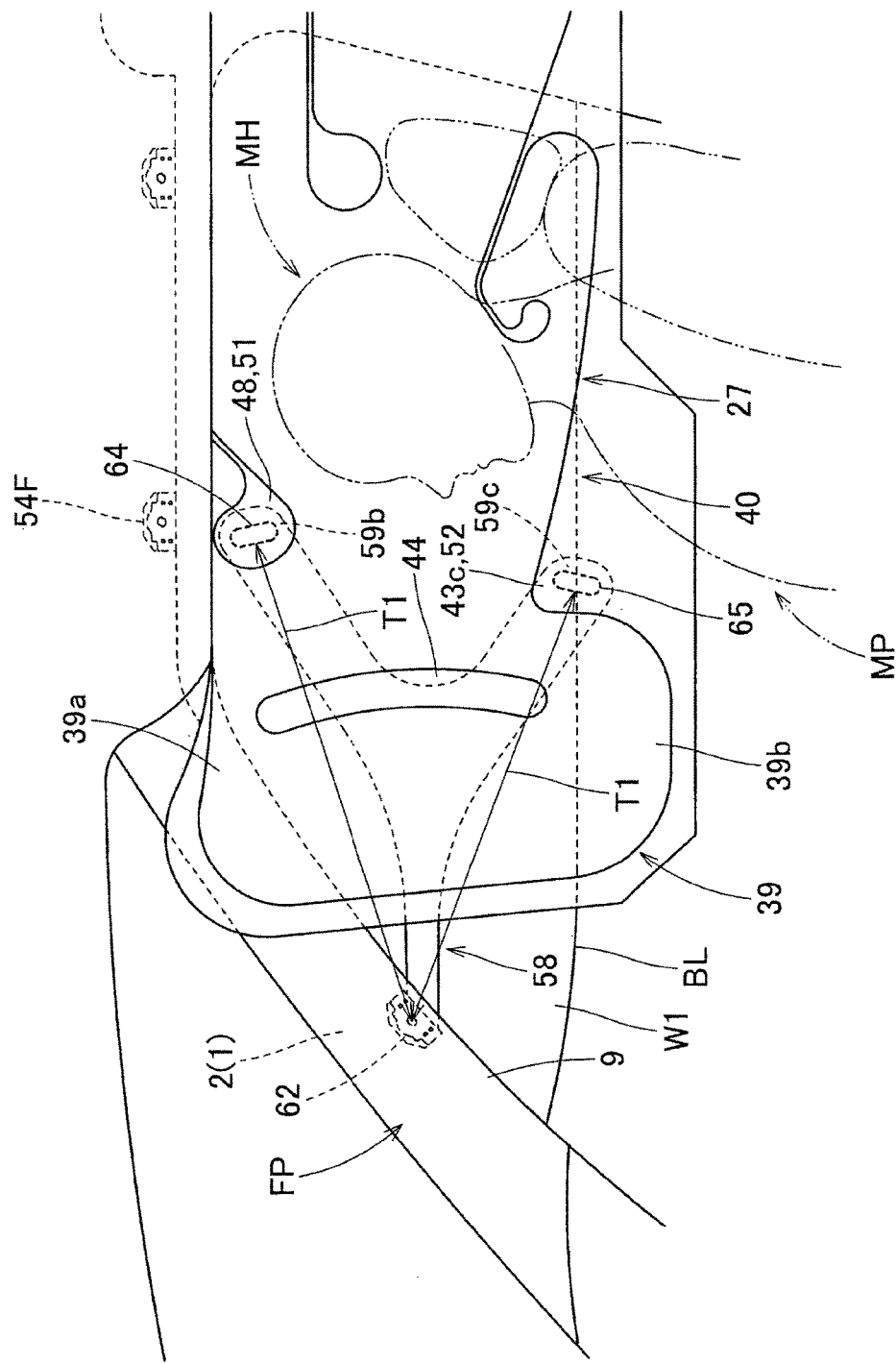
FIG. 8 is a partially-enlarged front view illustrating a state where the airbag of the head-protecting airbag device according to the embodiment is completely inflated when viewed from the inboard side.

As illustrated in a two-dot chain line of FIG. 1 and FIGS. 7 and 8, the airbag body 21 is configured to be deployed from the folded-up state when the inflation gas from the inflator 14 flows inside, and to cover the windows W1 and W2 and the inboard side I of the pillar garnishes 6 and 7 of a center pillar CP and the rear pillar RP. The outer shape of the airbag body 21 is set to a substantially rectangular shape of which a longitudinal direction substantially accords with a front and rear direction, such that the airbag body 21 can cover the inboard side from the window W1 to the front side of the rear pillar RP through the center pillar CP and the window W2 when the airbag body is completely inflated (see FIG. 3). As illustrated in FIGS. 7 and 8, the vertical width dimension of the airbag body 21 is set such that the lower periphery 21b at the time of the inflation completion is positioned below a beltline BL configured from the lower peripheries of the windows W1 and W2.

In the case of the embodiment, the airbag body 21 is produced of a double weave made of polyimide, polyester, or the like. In the embodiment, in addition to the airbag body 21, the mounting piece 54, which is disposed to protrude upward from an upper periphery 21a of the airbag body 21, is also produced of the double weave integrally with the airbag body 21. As illustrated in FIG. 9, the airbag body 21 includes an inflatable portion 22, which admits the inflation gas to flow inside such that an inboard side wall 22a positioned on the inboard side I and an outboard side wall 22b positioned on the outboard side O are separated to inflate a space therebetween at the time of the inflation completion, and a non-inflatable portion 42 (closed portion), which does not admit the inflation gas to flow inside by coupling the inboard side wall 22a and the outboard side wall 22b.

In the case of the embodiment, the inflatable portion 22 includes a main inflatable portion 24 (primary inflatable portion) which admits the inflation gas discharged from the inflator 14 to flow inside so as to inflate and to protect the head of the occupant even at time of the rollover of the vehicle V, and a front-side sub inflatable portion 30, a central-side sub inflatable portion 31, and a rear-side sub inflatable portion 32 (secondary inflatable portion) which communicate with the main inflatable portion 24 and complete the inflation after the main inflatable portion 24 is completely inflated. The inflatable portion 22 also includes communicating portions 34, 35, 36, and 37 which communicate the main inflatable portion 24 with the front-side sub inflatable portion 30, the central-side sub inflatable portion 31, and the rear-side sub inflatable portion 32, respectively. In the case of the embodiment, as illustrated in FIG. 3, the airbag body 21 is configured to be inflated when the inflation gas flows in the inside over the substantially entire surface except a slight area of an end-side partition portion 44, general partition portions 45 and 46, and thickness regulating portions 48 and 49 which partition the main inflatable portion 24, the front-side sub inflatable portion 30, the central-side sub inflatable portion 31, and the rear-side sub inflatable portion 32.

The main inflatable portion 24 includes a gas guidance path 25, a connection port 26, a front-seat protecting portion 27, and a rear-seat protecting portion 28.

The gas guidance path 25 is disposed over the almost entire area of the main inflatable portion 24 substantially in the front and rear direction so as to extend substantially along the upper periphery 21a of the airbag body 21 in the front and rear direction. The gas guidance path 25 is configured to guide the inflation gas G discharged from the inflator 14 into the front-seat protecting portion 27 and the rear-seat protecting portion 28 disposed below the gas guidance path 25. As illustrated in FIG. 3, in the case of the embodiment, the connection port 26 connected with the inflator 14 is disposed to communicate with the gas guidance path 25 and protrude upward from the gas guidance path 25 in a position deviated forward from the center of the gas guidance path 25 in the front and rear direction (a position deviated slightly forward from the substantially center of the airbag body 21 in the front and rear direction). The connection port 26 is formed to be tilted rearward and upward to the gas guidance path 25, and a rear end 26a thereof is formed to be open such that the inflator 14 can be inserted thereto. The connection port 26 is connected to the inflator 14 by fitting the clamp 15 to the outer circumference in a state where the inflator 14 is inserted thereinto. In the airbag 20 according to the embodiment, a separate inner tube (reference numeral omitted) for improving heat resistance is disposed from the connection port 26 to a portion of the gas guidance path 25 directly under the connection port 26 (see FIG. 3).

The front-seat protecting portion 27 is disposed at a side of the font seat at the time of the inflation completion. The front-seat protecting portion 27 protects the head of the occupant seated on the front seat when the airbag 20 is completely inflated at the time of side collision. The rear-seat protecting portion 28 is disposed at a side of the rear seat at the time of the inflation completion. The rear-seat protecting portion 28 protects the head of the occupant seated on the rear seat when the airbag 20 is completely inflated at the time of the side collision.

The front-side sub inflatable portion 30 is disposed on the front end 21c side of the airbag body 21 to be adjacent to the front side of the main inflatable portion 24 (front-seat protecting portion 27). In the airbag body 21 according to the embodiment, the front-side sub inflatable portion 30 disposed on the front end 21c side forms an end-side inflatable portion 39. In the case of the embodiment, the front-side sub inflatable portion 30 has an almost rod shape extending substantially vertically at the time of the inflation completion. The front-side sub inflatable portion 30 is partitioned from the front-seat protecting portion 27 adjacent to the rear side by the end-side partition portion 44 (to be described later). In the case of the embodiment, the front-side sub inflatable portion 30 is configured to extend downward from the beltline BL at the time of the inflation completion such that a lower end 39b is positioned below the front-seat protecting portion 27. The front-side sub inflatable portion 30 communicates with the front-seat protecting portion 27 through the communicating portion 33 open to the rear upper end and the communicating portion 34 open to the rear lower end. The openings of these communicating portions 33 and 34 are set to have a small width dimension, and thus the inflation gas starts to flow into the front-side sub inflatable portion 30 later than the front-seat protecting portion 27. In the airbag 20 according to the embodiment, the communicating portion 33 disposed on the upper side is disposed in the front side of the gas guidance path 25. However, the rear side is covered with the thickness regulating portion 48, and thus the inflation gas flowing into the gas guidance path 25 detours once due to the thickness regulating portion 48 so that it is suppressed that the inflation gas directly enters the front-side sub inflatable portion 30 through the communicating portion 33.

In the case of the embodiment, the central-side sub inflatable portion 31 is positioned in back of the front-seat protecting portion 27 of the main inflatable portion 24, and the rear end thereof is disposed to be adjacent to the rear-seat protecting portion 28 and to extend rearward from an area under the gas guidance path 25. The central-side sub inflatable portion 31 is disposed to be adjacent to the front-seat protecting portion 27 of the main inflatable portion 24. In the case of the embodiment, the central-side sub inflatable portion 31 communicates with the front-seat protecting portion 27 through the communicating portion 35 open to the rear side of the front-seat protecting portion 27. The opening of the communicating portion 35 is also set to have a small width dimension, and thus the inflation gas starts to flow into the central-side sub inflatable portion 31 later than the front-seat protecting portion 27. In the case of the embodiment, the rear-side sub inflatable portion 32 is positioned in front of the rear-seat protecting portion 28, is disposed to extend forward between the gas guidance path 25 and the central-side sub inflatable portion 31, and is disposed to be adjacent to the rear-seat protecting portion 28 of the main inflatable portion 24. In the case of the embodiment, the rear-side sub inflatable portion 32 communicates with the rear-seat protecting portion 28 through the communicating portion 36 open to the front end of the rear-seat protecting portion 28. The opening of the communicating portion 36 is also set to have a small width dimension, and thus the inflation gas starts to flow into the rear-side sub inflatable portion 32 later than the rear-seat protecting portion 28.

In the airbag body 21 according to the embodiment, the front-side sub inflatable portion 30 forms the end-side inflatable portion 39 disposed on the front end 21c side of the airbag body 21, and a portion of the inflatable portion 22 except the end-side inflatable portion 39 forms a general inflatable portion 40. The end-side inflatable portion 39 is partitioned from the front-seat protecting portion 27 forming the general inflatable portion 40 by the end-side partition portion 44. Specifically, in the case of the embodiment, the end-side partition portion 44 is separated from a peripheral portion 43, and is configured to have a slightly curved rod shape which extends substantially vertically and have a vertically central side protruding slightly rearward. An upper end 39a and the lower end 39b of the end-side inflatable portion 39 communicate with the front-seat protecting portion 27 through the communicating portions 33 and 34. The end-side inflatable portion 39 is configured such that the upper end 39a is disposed on the inboard side of the front pillar FP disposed to be vertically tilted rearward and upward on the front peripheral side of the window W1 when the inflation is completed. Specifically, the end-side inflatable portion 39 is disposed such that the upper end 39a covers the inboard side of the rear end area of the front pillar garnish 4 covering the inboard side of the front pillar FP when the airbag 20 is completely inflated. The end-side inflatable portion 39 is disposed such that the lower end 39b protrudes downward from the beltline BL when the airbag 20 is completely inflated (see FIGS. 7 and 8).

The non-inflatable portion 42 as a closed portion includes the peripheral portion 43 which forms the outer periphery of the inflatable portion 22, and the end-side partition portion 44, the general partition portions 45 and 46, and the thickness regulating portions 48 and 49 which are disposed in an area of the inflatable portion 22.

As illustrated in FIG. 3, the peripheral portion 43 is disposed to surround the entire periphery of the inflatable portion 22 except the rear end 26a of the connection port 26.

The end-side partition portion 44 partitions the front-side sub inflatable portion 30 and the front-seat protecting portion 27 (end-side inflatable portion 39 and general inflatable portion 40). In the case of the embodiment, both of the upper and lower ends of the end-side partition portion 44 are configured to be separated from the peripheral portion 43. In the case of the embodiment, the end-side partition portion 44 is configured to have a slightly curved rod shape such that a vertically central side protrudes slightly rearward. The end-side partition portion 44 is configured such that the upper end 44a protrudes upward from the general partition portion 46. The upper end 44a of the end-side partition portion 44 is disposed in a position of being overlapped with the lower half area of the thickness regulating portion 48 forming an upper coupled portion 51 (to be described later) in the front and rear direction. The lower end 44b of the end-side partition portion 44 is disposed in a position of being overlapped with a corner 43c of the peripheral portion 43 forming a lower coupled portion 52 (to be described later) in the front and rear direction.

The general partition portions 45 and 46 are disposed in an area of the general inflatable portion 40, and to partition the general inflatable portion 40 into the gas guidance path 25, the front-seat protecting portion 27, the rear-seat protecting portion 28, the central-side sub inflatable portion 31, and the rear-side sub inflatable portion 32. As illustrated in FIG. 3, the general partition portion 45 is formed to have a bent rod shape and partition the central-side sub inflatable portion 31 and the rear-seat protecting portion 28, and the central-side sub inflatable portion 31 and the rear-side sub inflatable portion 32. Specifically, the central-side sub inflatable portion 31 and the rear-seat protecting portion 28 is partitioned by a root-side portion 45a, which extends to be tilted forward and upward from the lower periphery of the peripheral portion 43. The central-side sub inflatable portion 31 and the rear-side sub inflatable portion 32 are partitioned by an intermediate portion 45b, which extends forward from the upper end of the root-side portion 45a in the front and rear direction, and a leading end-side portion 45c, which extends to be tilted forward and upward from the front end of the intermediate portion 45b. The general partition portion 46 forms the lower periphery of the gas guidance path 25, and is formed to extend from the upper end of the leading end-side portion 45c of the general partition portion 45 in the front and rear direction so as to partition the central-side sub inflatable portion 31 and the rear-side sub inflatable portion 32, and the gas guidance path 25. A circular partition portion 46a, which partitions the front-seat protecting portion 27 and the central-side sub inflatable portion 31 and regulates the thickness of the area, is disposed on the front end of the general partition portion 46 to protrude forward and downward. A curved partition portion 46b, which partitions the rear-seat protecting portion 28 and the rear-side sub inflatable portion 32 and is bent while being curved downward so as to regulate the thickness of the area, is disposed on the rear end of the general partition portion 46.

The thickness regulating portion 48 is formed to extend forward and downward from an upper portion 43a such that the thickness regulating portion 48 is continuous from the upper portion 43a which forms the upper periphery of the peripheral portion 43. In the case of the embodiment, the thickness regulating portion 48 is disposed in an area, which is closer to the central side (rear side) in the front and rear direction than the end-side partition portion 44, of the general inflatable portion 40. Specifically, the thickness regulating portion 48 is formed in the vicinity of the end-side partition portion 44. The thickness regulating portion 48 is configured to have a substantially droplet shape which swells toward the front and lower end. The thickness regulating portion 48 is an area above the general partition portion 46, and is disposed in a position of being overlapped with the upper end 44a of the end-side partition portion 44 in the front and rear direction in back of the end-side partition portion 44. The thickness regulating portion 49 is formed to extend forward and upward from the lower portion 43b, which forms the lower periphery of the peripheral portion 43. In the case of the embodiment, the thickness regulating portion 49 is formed to have an outer shape, which is a substantially reverse J-shape that the leading end protrudes forward from the circular partition portion 46a and extends downward, in the lower area than the circular partition portion 46a of the general partition portion 46, that is, the rear and lower peripheral side of the front-seat protecting portion 27. In the airbag 20 according to the embodiment, the gap between the end-side partition portion 44 and the upper portion 43a of the peripheral portion 43 forms the communicating portion 34, and the gap between the end-side partition portion 44 and the lower portion 43b of the peripheral portion 43 forms the communicating portion 35. The gap between the circular partition portion 46a of the general partition portion 46 and the thickness regulating portion 49 forms the communicating portion 36, and the gap between the curved partition portion 46b of the general partition portion 46 and the general partition portion 45 forms the communicating portion 37.

In the airbag body 21 according to the embodiment, the non-inflatable portion 42 (closed portion) includes the upper coupled portion 51 and the lower coupled portion 52 which couple the root end of the tension cloth 58 (rear upper end 59b and the rear lower end 59c of main body portion 59). The upper coupled portion 51 couples the upper end of the root end of the tension cloth 58 (rear upper end 59b of main body portion 59) to an upper coupling point 64. In the case of the embodiment, the upper coupled portion 51 is configured from the thickness regulating portion 48 formed to extend from the upper portion 43a of the peripheral portion 43. As described above, the thickness regulating portion 48 forming the upper coupled portion 51 is disposed in an area of the general inflatable portion 40, that is, the rear side from the end-side partition portion 44. The lower coupled portion 52 couples the lower end of the root end of the tension cloth 58 (the rear lower end 59c of the main body portion 59) to a lower coupling point 65. In the case of the embodiment, the lower coupled portion 52 is configured from the corner 43c, which is formed to partially protrude upward to form the lower periphery of the front-seat protecting portion 27, in the lower portion 43b of the peripheral portion 43. The corner 43c forming the lower coupled portion 52 is also disposed in the lower area of the front-seat protecting portion 27 forming the general inflatable portion 40. In other words, the corner 43c is disposed in an area of the general inflatable portion 40, that is, the rear side from the end-side partition portion 44.

The mounting piece 54 as a mounting portion is a portion for mounting the upper periphery 21a of the airbag body 21 on the inner panel 2 of the body 1 of the vehicle V. In the case of this embodiment, the mounting piece 54 protrudes upward from the upper periphery 21a of the airbag body 21, and is disposed at plural positions in the front and rear direction. In the case of the embodiment, the mounting piece 54 is formed at five positions. A mounting hole (reference numeral omitted) for inserting a mounting bolt 12 is formed in each mounting piece 54. In the embodiment, an end-side mounting piece 54F as an end-side mounting portion disposed on the front end 21c as the tension cloth 58 is disposed in an area on the general inflatable portion 40 side from the position of the root end including the position of the root end of the tension cloth 58 (rear upper end 59b and rear lower end 59c of main body portion 59). Specifically, the end-side mounting piece 54F is disposed in a position of being on the general inflatable portion 40 side (rear side) from the upper coupling point 64 and the lower coupling point 65 which couple the root end (rear upper end 59b and rear lower end 59c of main body portion 59) of the tension cloth 58 to the upper coupled portion 51 and the lower coupled portion 52. Specifically, the end-side mounting piece 54F is disposed in a position of being on the rear side from the lower coupling point 65 and being substantially overlapped vertically with the upper coupling point 64 not to protrude forward from the upper coupling point 64.

The tension cloth 58 is formed of a sheet material with flexibility. In the case of the embodiment, the tension cloth 58 is formed of a woven fabric of polyamide, polyester, or the like. As illustrated in FIGS. 7 to 9, the tension cloth 58 is disposed on the outboard side O of the end-side inflatable portion 39 (front-side sub inflatable portion 30) when the airbag body 21 is completely inflated, and includes the main body portion 59 covering the outboard side of the end-side inflatable portion 39, and the connection belt portion 61 disposed to extend forward from the front end of the main body portion 59. In the case of the embodiment, the main body portion 59 has a substantially V-shape of expanding to the rear end (root end) side to diverge in a fork shape. The rear upper end 59b and the rear lower end 59c of the main body portion 59 are coupled to the airbag body 21. That is, in the embodiment, the tension cloth 58 includes the upper coupling point 64 and the lower coupling point 65, which are formed in vertically separated positions, in the rear upper end 59b and the rear lower end 59c of the main body portion 59 as the root end. These upper coupling point 64 and lower coupling point 65 are formed in the upper coupled portion 51 and the lower coupled portion 52, which are disposed in an area of the general inflatable portion 40 as a central side (rear side) from the end-side partition portion 44 in the front and rear direction, in the airbag body 21 by sewing with a suture. The tension cloth 58 is coupled to the airbag body 21 at the two points of the upper coupling point 64 and the lower coupling point 65 separated vertically. The main body portion 59 of the tension cloth 58 is configured such that a rear periphery 59a (periphery on the root end of tension cloth 58) is curved to be recessed toward the leading end (forward) in an area between the upper coupling point 64 and the lower coupling point 65. In other words, the main body portion 59 includes a recess portion 60, in which the rear periphery 59a is recessed toward the front, in the vertically intermediate portion between the upper coupling point 64 and the lower coupling point 65. In the case of the embodiment, as illustrated in FIGS. 3 and 4, the recess portion 60 is formed to be largely recessed to enter an area of the end-side partition portion 44 in a state where the airbag body 21 and the tension cloth 58 are flatly deployed.

In the case of the embodiment, the connection belt portion 61 is disposed as a belt shape to extend substantially in the front and rear direction in a position slightly upper than the vertically center of the airbag body 21. The fixing piece 62 fixed to the body 1 is disposed on the front end 61a of the connection belt portion 61 (leading end of tension cloth 58). The fixing piece 62 is fixed to the inner panel 2 of the body 1 in the front pillar FP with the mounting bracket 11 and the mounting bolt 12, similarly to the mounting piece 54 formed in the airbag body 21. The fixing piece 62 includes a mounting hole (reference numeral omitted) into which the mounting bolt 12 can be inserted.

In the airbag 20 according to the embodiment, in a state where the airbag body 21 and the tension cloth 58 are flatly deployed, the upper coupling point 64 and the lower coupling point 65 are set to have substantially the same separation distance from the fixing piece 62. That is, as illustrated in FIG. 4, in the airbag 20 according to the embodiment, a separation distance L1 between the fixing piece 62 and the upper coupling point 64 is substantially the same as a separation distance L2 between the fixing piece 62 and the lower coupling point 65. In the airbag 20 according to the embodiment, the upper coupling point 64 and the lower coupling point 65 have long circular outer shapes. The upper coupling point 64 is disposed to be tilted rearward and downward, and the lower coupling point 65 is disposed to be tilted rearward and upward such that the upper coupling point 64 and the lower coupling point 65 extend substantially along an arc-shape centering on the fixing piece 62. In the airbag 20 according to the embodiment, a tension T1 occurs on each of the straight line connecting the fixing piece 62 and the upper coupling point 64 and the straight line connecting the fixing piece 62 and the lower coupling point 65 in the tension cloth 58 when the airbag body 21 is completely inflated (see FIG. 8). In the airbag body 21, when the inflation is completed, the front-seat protecting portion 27, the rear-seat protecting portion 28, the central-side sub inflatable portion 31, and the rear-side sub inflatable portion 32 are inflated from the non-inflated state to shorten the width dimension in the front and rear direction while separating the inboard side wall 22a and the outboard side wall 22b from each other. Therefore, as illustrated in FIG. 7, a tension T2 also occurs substantially in the front and rear direction on the straight line connecting the vicinity of the almost vertical center of the end-side partition portion 44 and the mounting piece 54R between the end-side partition portion 44 and the mounting piece 54R on the rear end.

Figure 6:
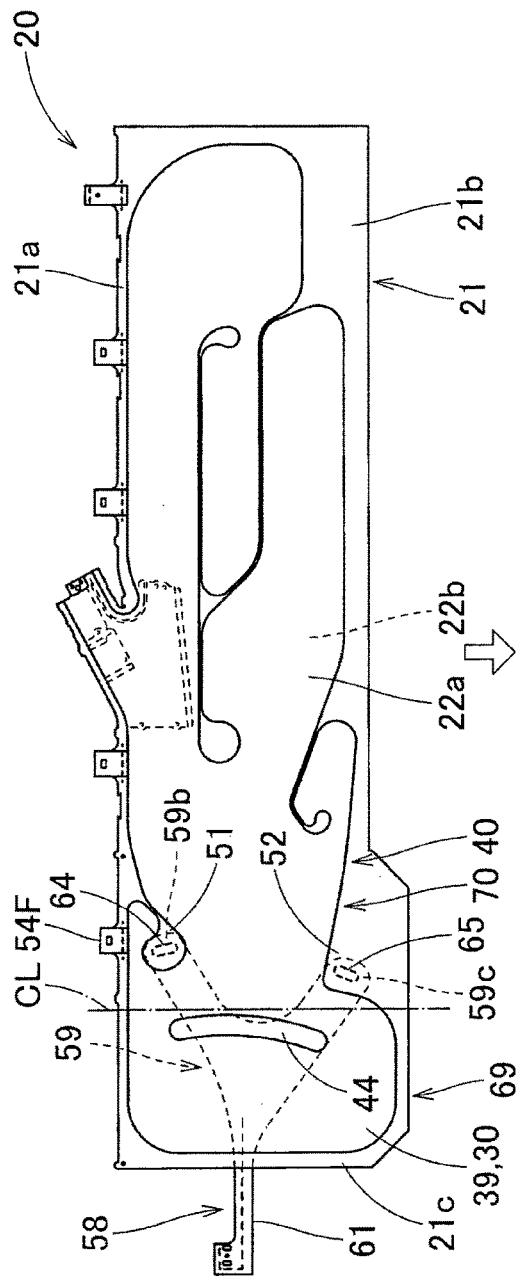
FIGS. 6A and 6B are front views illustrating a folding of a folded portion when the airbag of FIG. 3 is stored on a vehicle in a folded-up state.

Next, the description will be given about installing the head-protecting airbag device M according to the embodiment on the vehicle V. In advance, the tension cloth 58 is sewed on the airbag body 21 with a suture so as to form the upper coupling point 64 and the lower coupling point 65, and the airbag 20 is produced. Next, the airbag body 21 is flatly deployed with the inboard side wall 22a and the outboard side wall 22b overlapped, and the airbag 20 is folded up from the state. In the embodiment, first, the airbag body 21 is folded to shorten the width dimension in the front and rear direction. Specifically, the portion of the airbag body 21 on the front end 21c is folded in a position, which is closer to the central side in the front and rear direction than the end-side partition portion 44, by attaching a substantially vertical fold line CL (see FIG. 6A), so that a folded portion 68 is formed as illustrated in FIG. 6B. The folded portion 68 includes a superimposing portion 69 on the end-side inflatable portion 39 side, and a superimposed portion 70, which is adjacent to the superimposing portion 69 and is folded to be superimposed on the superimposing portion 69, on the general inflatable portion 40 side. Thus, the fold line CL forms a boundary portion between the superimposing portion 69 and the superimposed portion 70. In the case of the embodiment, the folded portion 68 is formed such that the superimposing portion 69 is folded to be superimposed on the inboard side of the superimposed portion 70. In the case of the embodiment, the fold line CL forming the boundary portion between the superimposing portion 69 and the superimposed portion 70 is disposed in an area of the general inflatable portion 40 beyond the end-side partition portion 44, specifically, an area between the end-side partition portion 44, and the upper coupled portion 51 and the lower coupled portion 52. In the embodiment, as illustrated in FIG. 6A, the fold line CL is formed near the rear side of the end-side partition portion 44. That is, in the embodiment, the upper coupled portion 51 and the lower coupled portion 52 coupling the root end (rear upper end 59b and rear lower end 59c of the main body portion 59) of the tension cloth 58 are disposed in the superimposed portion 70 when the folded portion 68 is formed. In other words, in the tension cloth 58, the rear upper end 59b and the rear lower end 59c of the main body portion 59 as the root end are coupled to an area of the superimposed portion 70. In the airbag 20 according to the embodiment, in the mounting piece (mounting portion) 54, the end-side mounting piece (end-side mounting portion) 54F, which is disposed on the front end as the tension cloth 58 side, is also disposed in the superimposed portion 70 when the folded portion 68 is formed.

After the folded portion 68 is formed, the airbag body 21 is folded up such that the lower periphery 21b is brought close to the upper periphery 21a, thereby forming a folded-up body 72. Specifically, in the embodiment, in the airbag body 21, the gas guidance path 25 which is an area on the upper periphery 21a side is folded in a bellows manner by attaching a plurality of fold lines in the front and rear direction, and the front-seat protecting portion 27 and the rear-seat protecting portion 28 below the gas guidance path 25 are folded in a rolling manner to roll the lower periphery 21b toward the outboard side, thereby forming the folded-up body 72 which is long in the front and rear direction as illustrated in FIGS. 1 and 2. As illustrated in FIG. 1, the folded-up body 72 is configured to be stored only in an area of the roof side rail RR and not to be stored in the front pillar FP, when being installed on the vehicle V. After forming the folded-up body 72, a breakable wrapping material (not illustrated) for preventing folding-collapse surrounds a predetermined position around the folded-up body 72.

Thereafter, the inflator 14 mounted with the mounting bracket 16 is connected with the connection port 26 of the airbag 20 through the clamp 15, and the mounting bracket 11 is fixed to each mounting piece 54 and the fixing piece 62, thereby forming an airbag assembly.

Next, the mounting brackets 11 and 16 are disposed at predetermined positions of the inner panel 2 of the body 1, the lead wire (not illustrated), which extends from the predetermined control device for operating the inflator, is connected to the inflator 14 to lock the bolts 12 and 16. The front pillar garnish 4 and the roof head lining 5 are mounted on the inner panel 2 of the body 1, and further, the pillar garnishes 6 and 7 are mounted on the inner panel 2 of the body 1. Then, the head-protecting airbag device M can be installed on the vehicle V.

After the head-protecting airbag device M is installed on the vehicle V, an operation signal sent from the control device is received to operate the inflator 14 at the time of the side collision or the rollover of the vehicle V. Then, the inflation gas discharged from the inflator 14 flows into the airbag body 21 of the airbag 20. The inflated airbag 20 (airbag body 21) breaks the wrapping material (not illustrated), presses and opens the airbag cover 9 formed from the lower periphery of the front pillar garnish 4 and the roof head lining 5, and protrudes downward. As illustrated in the two-dot chain line of FIG. 1, and FIG. 7, the airbag 20 is largely inflated to cover the windows W1 and W2, the central pillar CP, and the partial inboard side of the rear pillar RP.

In the head-protecting airbag device M according to the embodiment, in the tension cloth 58 covering the outboard side of the end-side inflatable portion 39, the rear upper end 59b and the rear lower end 59c, as the root end, of the main body portion 59 are coupled to an area of the general inflatable portion 40 which is closer to the central side (rear side) in the front and rear direction than the end-side partition portion 44. For this reason, in the head-protecting airbag device M according to the embodiment, the end-side inflatable portion 39 can be folded also at a position which is closer to the central side (rear side) in the front and rear direction than the end-side partition portion 44. Thus, as in the embodiment, when the airbag 20, which is folded up with the end-side inflatable portion 39 folded, is stored in the upper peripheries of the windows W1 and W2, a freedom degree of setting a folded amount is high. For this reason, for example, as in the embodiment, even when the vehicle V has a type with the front pillar FP which has a small tilted angle in the front and rear direction and is elongated in the front and rear direction, the embodiment can be easily adapted in such a manner that the airbag is folded up with a folded amount set to be large. The folded-up airbag 20 can be stored in the upper peripheries of the windows W1 and W2 in the state of suppressing entrance into the front pillar FP. As illustrated in FIG. 1, in the head-protecting airbag device M according to the embodiment, the folded-up airbag body 21 is not stored in an area of the front pillar FP, but only the tension cloth 58 is stored therein. Thus, it can be suppressed that the front pillar garnish 4 covering the inboard side of the front pillar FP becomes bulky, and design is also excellent. The airbag body 21 folded up in a substantially rod shape also may not enter into the curved front pillar FP, and may be stored only in an area of the substantially linear roof side rail RR. Thus, an assembly operation to the body 1 side also can be efficiently performed.

Therefore, the head-protecting airbag device M according to the embodiment has a high freedom degree in installing on the vehicle V, and can be easily adapted even when the installed vehicle is changed.

In the head-protecting airbag device M according to the embodiment, the mounting piece 54 as a mounting portion and the end-side mounting piece 54F as an end-side mounting portion are formed to partially protrude upward from the upper periphery 21a of the airbag body 21. For this reason, the mounting piece 54 and the end-side mounting piece 54F can protrude from the folded-up body 72 formed by folding up the airbag body 21, and thus the folded-up airbag 20 is fixed to the body 1 of the vehicle V with excellent workability.

Figure 11:
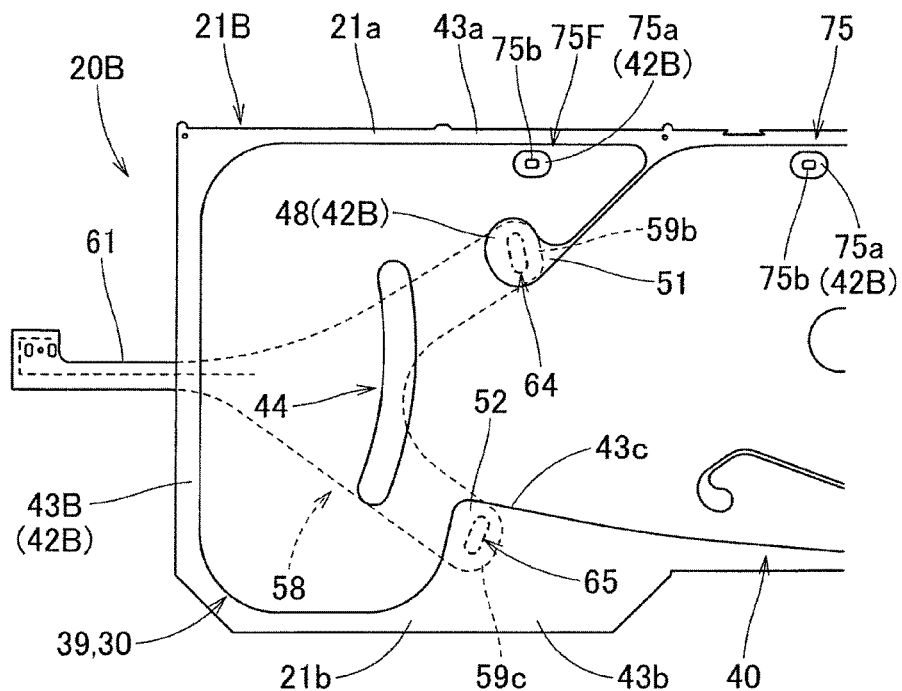
FIG. 11 is a partially-enlarged front view illustrating an airbag according to still another embodiment of the invention.
Figure 12:
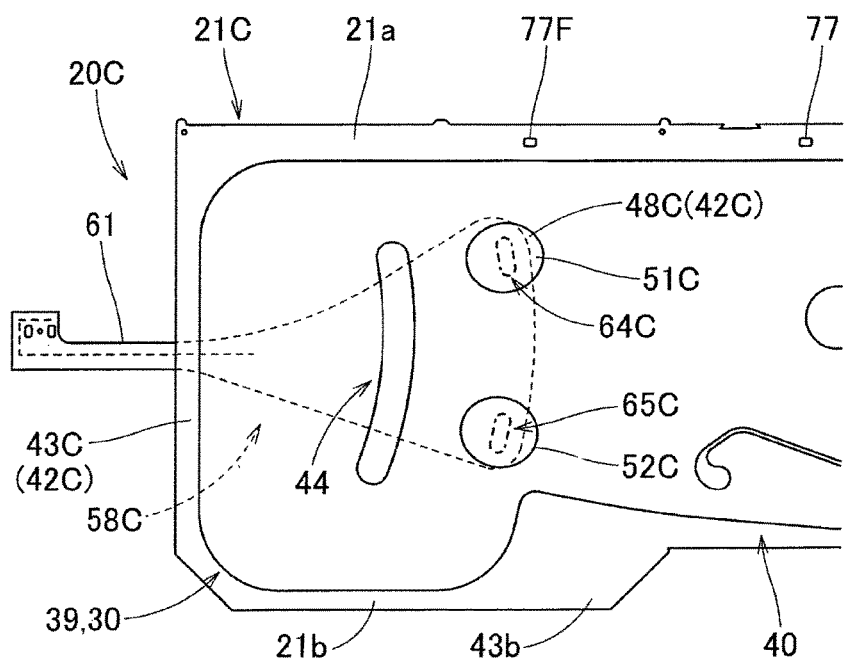
FIG. 12 is a partially-enlarged front view illustrating an airbag according to still further another embodiment of the invention.

In consideration of the above point, as airbags 20B and 20C illustrated in FIGS. 11 and 12, the mounting portions 75 and 77 and the end-side mounting portions 75F and 77F also may be configured not to protrude from the airbag bodies 21B and 21C. Specifically, in the airbag 20B illustrated in FIG. 11, the mounting portion 75 and the end-side mounting portion 75F are configured such that a peripheral coupling portion 75a as the closed portion 42B is provided in an area of the inflatable portion below the upper portion 43a of the peripheral portion 43B, and the opening 75b, through which the mounting bolt (not illustrated) is insertable, is provided in the peripheral coupling portion 75a. In the airbag 20C illustrated in FIG. 12, the mounting portion 77 and the end-side mounting portion 77F are configured to form an opening, through which the mounting bolt is insertable, in an area of the upper portion 43a of the peripheral portion 43C.

In the head-protecting airbag device M according to the embodiment, the tension cloth 58, which generates the tension T1 substantially in the front and rear direction, pushed the end-side inflatable portion 39 to the inboard side I when the airbag 20 is completely inflated. Specifically, when the airbag 20 is completely inflated, the end-side inflatable portion 39 is disposed to be tilted in the front and rear direction such that the end-side inflatable portion 39 is bent at the end-side partition portion 44, and the front end thereof extends to the inboard side I (see FIG. 9). When the airbag 20 is completely inflated, the outboard side O of the end-side inflatable portion 39 can be supported by the tension cloth 58. Thus, even at the time of the oblique collision, the head MH of the occupant MP moving obliquely forward can be exactly protected by the end-side inflatable portion 39 (see FIG. 9). In the case of the embodiment, the end-side inflatable portion 39 is disposed such that the upper end 39a at the time of the inflation completion covers the inboard side of the front pillar FP (front pillar garnish 4), and the lower end 39b at the time of the inflation completion is positioned downward from the beltline BL (see FIG. 8). For this reason, when receiving the head MH of the occupant MP moving obliquely forward on the outboard side, the upper end 39a of the end-side inflatable portion 39 can be supported by the front pillar garnish 4, and the lower end 39b can be supported by a member such as a door trim which is disposed to protrude to the inboard side from the window W1 on the lower side of the beltline BL. Thus, the head MH of the occupant MP can be restricted exactly.

In the head-protecting airbag device M according to the embodiment, the tension cloth 58 is configured such that the main body portion 59 diverges to the rear end in a fork shape, the upper coupling point 64 and the lower coupling point 65 formed in positions separated vertically from each other are provided in the rear upper end 59b and the rear lower end 59c, as the root end, of the main body portion 59, and the upper coupling point 64 and the lower coupling point 65 are coupled to the upper coupled portion 51 and the lower coupled portion 52 as the non-inflatable portion (closed portion) 42, respectively. For this reason, the tension cloth 58 supports the outboard side of the end-side inflatable portion 39 in a vertically wide range, and thus the head of the occupant can be more exactly protected by the end-side inflatable portion 39. In consideration of the above point, the entire tension cloth may be configured as a belt shape substantially in the front and rear direction such that the root end is coupled to the airbag body at a point.

In the head-protecting airbag device M according to the embodiment, the upper coupled portion 51 and the lower coupled portion 52 of the airbag body 21 are together formed to be continuous from the upper portion 43a or the lower portion 43b of the peripheral portion 43. Specifically, in the head-protecting airbag device M according to the embodiment, the upper coupled portion 51 is disposed in vicinity of the upper portion 43a of the peripheral portion 43, and the lower coupled portion 52 is formed from the corner 43c which is a portion of the lower portion 43b of the peripheral portion 43. That is, in the head-protecting airbag device M according to the embodiment, the upper coupled portion 51 and the lower coupled portion 52 coupling the rear upper end 59b and the rear lower end 59c of the tension cloth 58 are configured to be disposed to be largely separated vertically in positions of the upper periphery 21a and the lower periphery 21b of the airbag body 21. Thus, the tension cloth 58 widely covers the vertically almost entire area of the outboard side of the end-side inflatable portion 39. In the embodiment, the airbag body 21 is formed of the double weave. However, in a case where the airbag body is produced by sewing a predetermined position of the two ground fabrics with a suture, and the upper coupled portion and the lower coupled portion are configured to be continuous from the peripheral portion, the upper coupled portion and the lower coupled portion can be formed in a shape of a one-stroke sketch continuously with the peripheral portion, and the number of the production processes and a cost can be reduced.

Figure 10:
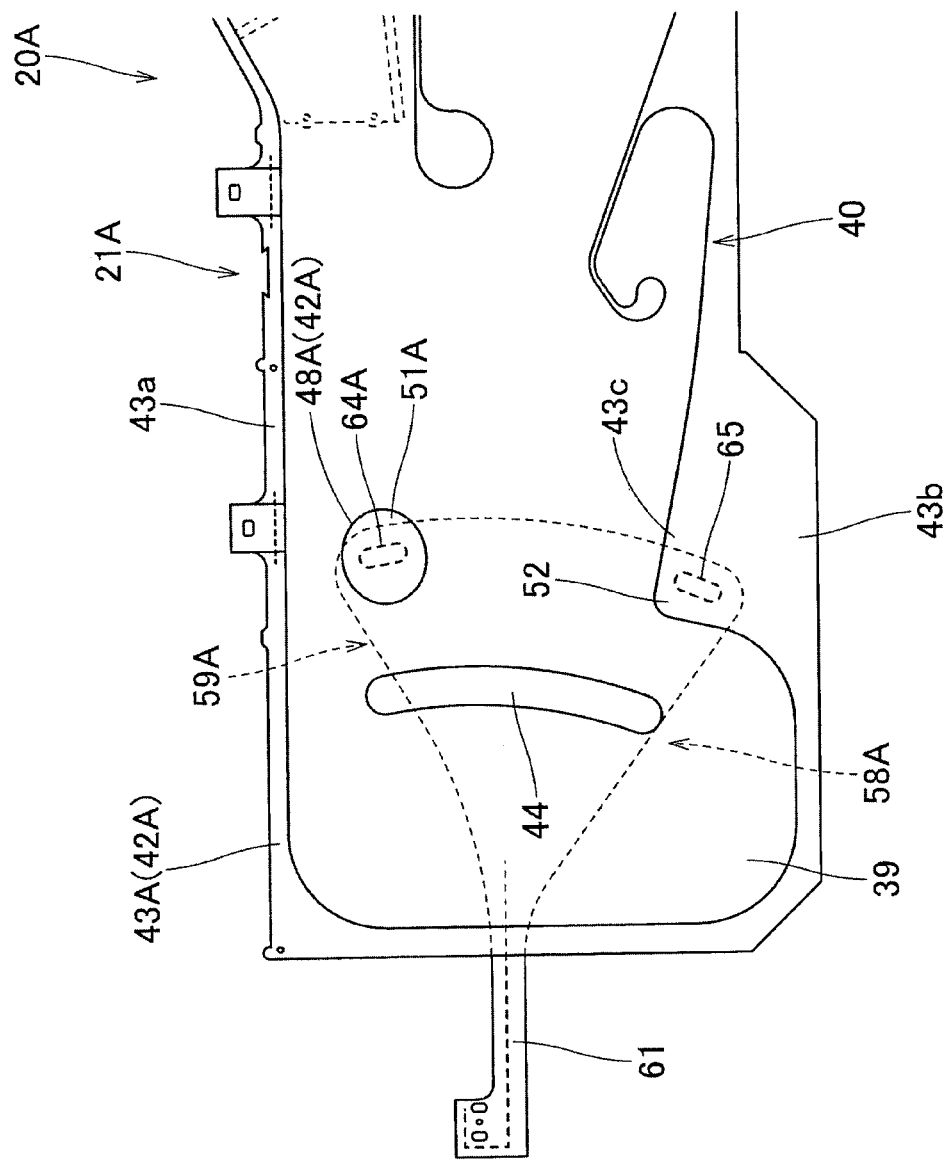
FIG. 10 is a partially-enlarged front view illustrating an airbag according to another embodiment of the invention.

In consideration of the above point, for example, as in the airbag 20A illustrated in FIG. 10, only the lower coupled portion 52 forms a portion of the peripheral portion 43A, and the upper coupled portion 51A (thickness regulating portion 48A) may be configured to be separated from the peripheral portion 43A. As in the airbag 20C illustrated in FIG. 12, both of the upper coupled portion 51C (thickness regulating portion 48C) and the lower coupled portion 52C may be configured to be separated from the peripheral portion 43C. When the upper coupled portion and the lower coupled portion are configured to be separated from the peripheral portion, a freedom degree of the disposing position of the upper coupling point and the lower coupling point can be increased compared with the case of being disposed to be continuous from the peripheral portion as in the embodiment.

In the head-protecting airbag device M according to the embodiment, the main body portion 59 of the tension cloth 58 includes the recess portion 60, in which the rear periphery 59a is formed to be recessed toward the front, that is, the leading end, in an area between the upper coupling point 64 and the lower coupling point 65. For this reason, by forming the main body portion 59 to be recessed, the usage amount of the sheet material forming the tension cloth 58 can be reduced, the airbag 20 can be folded up compactly, and a reduction in weight can be achieved. As in the embodiment, even when the airbag is folded up in a state where folded portion 68 is formed by folding the end-side inflatable portion 39 to the general inflatable portion 40 side, an amount of superimposing the main body portion 59 of the tension cloth 58 on an area of the folded portion 68 can be reduced so that it can be suppressed that the folded portion 68 becomes bulky. Particularly, in the airbag 20 according to the embodiment, the recess portion 60 is configured to be largely recessed so as to enter an area of the end-side partition portion 44 in a state where the airbag body 21 and the tension cloth 58 are deployed, and an amount of superimposing the general inflatable portion 40 on the front end-side portion (area of superimposed portion 70) is small. Thus, it can be suppressed that the folded portion 68 becomes bulky, and it can be suppressed that the folded-up body 72 becomes partially bulky. As long as the tension cloth does not inhibit smooth extraction of the end-side inflatable portion to the inboard side, the recess portion may be configured to be further largely recessed so as to enter an area of the end-side inflatable portion. Of course, in consideration of the above point, as in the airbag 20A illustrated in FIG. 10, the main body portion 59A of the tension cloth 58A may be not provided with the recess portion, but used in a substantially fan shape.

In the head-protecting airbag device M according to the embodiment, the separation distances L1 and L2 between the fixing piece 62 which fixes the leading end (front end 61a of connection belt portion 61) of the tension cloth 58 to the body 1, and the upper coupling point 64 and the lower coupling point 65 are set to have substantially the same distance. Thus, when the airbag body 21 is completely inflated, the tension T1 is generated both on the line connecting the fixing piece 62 and the upper coupling point 64, and on the line connecting the fixing piece 62 and the lower coupling point 65. For this reason, when the airbag body 21 is completely inflated, the tension can occur in a vertically wide fan-shaped area, which is between both peripheries connecting the fixing piece 62, and the upper coupling point 64 and the lower coupling point 65, in the tension cloth 58. Thus, the tension cloth 58, in which the tension is generated in a vertically wide area, can support the outboard side of the end-side inflatable portion 39 further stably. In consideration of the above point, the tension cloth may be configured such that the separation distances between the fixing piece with the upper coupling point and the lower coupling point are different from each other.

In the embodiment, the folded-up body 72 is formed by folding up the airbag 20 in a state where the end-side inflatable portion 39 disposed on the front end 21c of the airbag body 21 is folded to shorten a width dimension in the front and rear direction. Therefore, when being completely inflated, the airbag body 21 is disposed to cover the inboard side of the windows W1 and W2 in an area wider in the front and rear direction than in the state of the folded-up body 72. That is, in the folded-up body 72 according to the embodiment, the airbag body 21 is compactly stored with the width dimension in the front and rear direction shortened, and can be inflated from the state to cover the inboard side of the windows W1 and W2 widely in the front and rear direction. For this reason, for example, as in the embodiment, although the vehicle V has a type with the front pillar FP which has a small tilted angle in the front and rear direction and is elongated in the front and rear direction, the folded-up body 72 can be stored in the upper peripheries of the windows W1 and W2 in a state where it is suppressed that the airbag body 21 enters the front pillar FP. When the airbag 20 is completely inflated, the inboard side of the front pillar FP can be widely covered with the unfolded end-side inflatable portion 39.

In the embodiment, the airbag body 21 is configured such that the airbag body is stored in a state where the airbag body is folded by attaching the fold line CL in an area (rear side of end-side partition portion 44) of the general inflatable portion 40 beyond the end-side partition portion 44, and is folded up to shorten the vertical width dimension. However, the position of the fold line is not limited to the embodiment. For example, in a case where the shape of the front pillar FP is not similar with the vehicle V according to the embodiment, that is, the installed vehicle V has a type with a front pillar FP which has a small tilted angle in the front and rear direction and extends vertically long, and an area of the roof side rail is relatively long so that the airbag can be smoothly stored even with a small folded amount, the airbag body 21 may be configured to be stored in a state where the airbag body is folded by attaching the fold line to the front side of the end-side partition portion 44 and is folded up. The airbag body may be configured to be stored in the upper peripheral side of the window in a state where the airbag body is folded up to shorten a vertical width dimension without folding in the front and rear direction.

In the embodiment, the description has given about an example of the airbag of which the end-side inflatable portion is disposed to the front end of the airbag body. However, a position of disposing the end-side inflatable portion is not limited to the embodiment, and the end-side inflatable portion may be configured to be disposed on the rear end of the airbag body.

What is claimed is:

1. A head-protecting airbag device comprising:
an airbag which is stored in a folded-up state in an upper periphery of a window on an inboard side of a vehicle, and is deployed to cover the inboard side of the window when an inflation gas flows from an inflator, the airbag including:
   an airbag body which is formed in a bag shape with flexibility, and is inflated to cover the inboard side of the window when the inflation gas flows inside;
   a mounting portion which is disposed at plural positions in a front and rear direction of the airbag body, and fixes the airbag body to a body of the upper periphery of the window; and
   a tension cloth which is formed of a sheet material with flexibility, the tension cloth having a root end coupled to the airbag body and a leading end fixed on the body of the vehicle in the periphery of the window separated from one end of the airbag body in the front and rear direction, wherein:
the airbag body includes an inflatable portion, which is inflated to separate an inboard side wall and an outboard side wall when the inflation gas flows inside, and a closed portion which is formed by coupling the inboard side wall and the outboard side wall and does not admit the inflation gas to flow inside;
the inflatable portion includes a general inflatable portion and an end-side inflatable portion, the closed portion includes an end-side partition portion, the end-side inflatable portion is partitioned from the general inflatable portion by the end-side partition portion on an end, defining a tension cloth side, in the front and rear direction at the time of the inflation completion;
the tension cloth is disposed on the outboard side of the end-side inflatable portion in the airbag body at the time of the inflation completion, and the root end of the tension cloth is coupled to an area of the general inflatable portion which is closer to a central side in the front and rear direction than the end-side partition portion; and
in the mounting portion, an end-side mounting portion disposed at the tension cloth side is disposed at a position of the root end in an area of the general inflatable portion.

2. The head-protecting airbag device according to claim 1, wherein
each of the mounting portion and the end-side mounting portion is formed to protrude from the upper periphery of the airbag body.

3. The head-protecting airbag device according to claim 1, wherein:
the tension cloth includes an upper coupling point and a lower coupling point, which are formed in vertically separated positions, on the root end; and
the upper coupling point and the lower coupling point are coupled to an upper coupled portion and a lower coupled portion, respectively, the closed portion includes the upper coupled portion and the lower coupled portion.

4. The head-protecting airbag device according to claim 3, wherein:
the closed portion includes a peripheral portion forming an outer periphery of the inflatable portion; and
at least one of the upper coupled portion and the lower coupled portion is formed to be separated from the peripheral portion.

5. The head-protecting airbag device according to claim 3, wherein:
the closed portion includes a peripheral portion forming an outer periphery of the inflatable portion; and
the upper coupled portion and the lower coupled portion are formed to be continuous together from the peripheral portion.

6. The head-protecting airbag device according to claim 3, wherein
the tension cloth is configured such that a periphery on the root end thereof is recessed toward the leading end in an area between the upper coupling point and the lower coupling point.

7. The head-protecting airbag device according to claim 3, wherein
the tension cloth is configured such that a separation distance to the upper coupling point from a fixing piece, which fixes the tension cloth to the body on the leading end is substantially equal to a separation distance to the lower coupling point from the fixing piece.

8. A folded-up body of a head-protecting airbag comprising:
an airbag body which is deployed to cover an inboard side of a window of a vehicle when an inflation gas flows from an inflator, the folded-up body of the head-protecting airbag being formed in a folded-up state to be storable in an upper periphery of the window, wherein:
the airbag includes:
an airbag body;
a mounting portion which is disposed at plural positions in a front and rear direction of the airbag body and fixes the airbag body to a body of the upper periphery of the window; and
a tension cloth which is formed of a sheet material with flexibility and is disposed on an outboard side of the airbag body at the time of the inflation completion and having a root end coupled to the airbag body and a leading end fixed on the body of the vehicle in the periphery of the window separated from one end of the airbag body in the front and rear direction;
the airbag body includes an inflatable portion, which is inflated to separate an inboard side wall and an outboard side wall when the inflation gas flows inside, and a closed portion which is formed by coupling the inboard side wall and the outboard side wall and does not admit the inflation gas to flow inside;
the inflatable portion includes a general inflatable portion and an end-side inflatable portion, the closed portion includes an end-side partition portion, the end-side inflatable portion is partitioned from the general inflatable portion by the end-side partition portion, on an end, defining a tension cloth side, in the front and rear direction at the time of the inflation completion;
the airbag body of the folded-up body is folded in a shape having a folded portion which is folded to superimpose the end-side inflatable portion on the general inflatable portion so as to shorten a width dimension in the front and rear direction;
the folded portion includes a superimposing portion on an end-side inflatable portion side and a superimposed portion, which is adjacent to the superimposing portion and superimposed by the superimposing portion, on the general inflatable portion;
a fold line forming a boundary portion between the superimposing portion and the superimposed portion is formed in an area of the general inflatable portion beyond the end-side partition portion;
the tension cloth is configured such that the root end thereof is coupled to an area of the superimposed portion; and
in the mounting portion, an end-side mounting portion, which is disposed on one end in the front and rear direction as the tension cloth side, is disposed on the superimposed portion.

9. The folded-up body of the head-protecting airbag according to claim 8, wherein
each of the mounting portion and the end-side mounting portion is formed to protrude from the upper periphery of the airbag body.

10. The folded-up body of the head-protecting airbag according to claim 8, wherein:
the tension cloth includes an upper coupling point and a lower coupling point, which are formed in vertically separated positions, on the root end; and
the upper coupling point and the lower coupling point are coupled to an upper coupled portion and a lower coupled portion, respectively, the closed portion includes the upper coupled portion and the lower coupled portion.

11. The folded-up body of the head-protecting airbag according to claim 10, wherein
the tension cloth is configured such that a periphery on the root end thereof is recessed toward the leading end in an area between the upper coupling point and the lower coupling point which are coupled to the upper coupling point and the lower coupling point.

12. The folded-up body of the head-protecting airbag according to claim 10, wherein
the tension cloth is configured such that a separation distance to the upper coupling point from a fixing piece, which fixes the tension cloth to the body on the leading end is substantially equal to a separation distance to the lower coupling point from the fixing piece.

* * * * *